United States Patent Office 3,081,211
Patented Mar. 12, 1963

3,081,211
METHOD OF SELECTIVE ETCHING

Arthur M. Rickel, Jr., Garden City, Mich., assignor to The Bendix Corporation, a corporation of Delaware No Drawing. Filed Feb. 8, 1960, Ser. No. 7,092
7 Claims. (Cl. 156—9)

This invention pertains to a selective etching mixture and, more particularly, to a nitric acid-hydrofluoric acid etching compound that is relatively ineffective for etching lead.

In some applications it is desirable to etch one material but not another so that the etching solution used must be selective and act only on the one material. Such a use is defined in the co-pending application entitled "Method of Chemical Machining" by Hoeckelman, Lenard and Rickel, filed on January 27, 1960, U.S. Serial Number 4,998, wherein it is desired to etch electroless nickel and silicon, which require rather strong etching solutions, but where it is desired not to etch lead deposits on certain areas of the electroless nickel. The etch of this invention satisfies these requirements by using in combination concentrated nitric acid, concentrated hydrofluoric acid and concentrated sulphuric acid. The nitric and hydrofluoric acids form a very strong etching solution which effectively etches the electroless nickel and the silicon and would also, ordinarily, etch the lead. However, the sulphuric acid combines chemically with the lead to form a protective coating of lead sulphate which resists the action of the nitric and hydrofluoric acids. The sulphuric acid does not react chemically with the electroless nickel or the silicon to form a protective coating thereon so that these materials may be etched in a normal manner by the acids. Other compounds may be used in place of the sulphuric acid to form the protective coating and this would be desirable in the case where basic etching compounds are used and, therefore, the compound which reacts with the lead to form a protective coating should also be of a basic nature.

It is, therefore, an object of this invention to provide a selective etching mixture which has an ingredient which reacts chemically with a portion of the substance to be etched to form a protective coating over the substance which resists the etching ingredients of the mixture so that selective etching of the mixture is possible.

It is an object of this invention to provide a selective etching mixture for a substance containing lead wherein the etching ingredients comprise nitric and hydrofluoric acid and a further ingredient is sulphuric acid, but with the sulphuric acid reacting with the lead in a substance to be etched to form a protective coating of lead sulphate which resists the etching action of the nitric and hydrofluoric acids.

It is a further object of this invention to provide a selective etching mixture which has basic etch ingredients and a basic ingredient, such as potassium or sodium bromide, potassium dichromate, or potassium or sodium sulphate, which will react with lead or other material desired to be protected to form a protective coating to resist the basic etching ingredients.

These and other objects will become more apparent when preferred embodiments of my invention are described below.

As mentioned in certain applications, more particularly in the chemical machining in the above mentioned copending application, it is desired to perform selective etching. In the case where a strong etch is desired containing nitric and hydrofluoric acids, it has been found that by the addition of sulphuric acid electroless nickel and silicon base having lead deposits thereon may be etched while the lead is protected. This can be accomplished by using an etching mixture having one part concentrated nitric acid, two parts concentrated hydrofluoric acid, four parts concentrated sulphuric acid, and five parts water. The nitric and hydrofluoric acids form a strong etching mixture which etches effectively the electroless nickel plate and the silicon but provides relatively little etching action on the lead since it has been protected with a coating of lead sulphate.

In the case where basic instead of acidic ingredients are used in the etching mixture, then it is desirable to use a basic ingredient to react with the lead to form the protective coating. Materials that may be used for this purpose are sodium or potassium bromide, which react to form a protective coating of lead bromide, potassium dichromate, which reacts with lead to form a protective coating of the lead chromate, sodium or potassium sulphate, which reacts with lead to form a protective coating of lead sulphate.

It is also possible, of course, to protect metals other than lead with either the above mentioned compounds or compounds adaptable to chemically react with the material to be protected to form the desired protective coating.

Although this invention has been disclosed with reference to particular applications, the principles involved are susceptible of numerous other applications which will be apparent to persons skilled in the art. The invention is, therefore, to be limited only as indicated by the scope of the appended claims.

Having thus described my invention, I claim:

1. The method of selective etching with an acidic etch a surface having only a portion thereof covered with lead compounds which portion is to be protected from the etching action comprising the steps of applying an etch containing a sulphuric acid solution which will react with said lead compound to form a protective coating of lead sulphate on said lead compound which will resist etching of said lead compound.

2. The method of selective etching with a basic etch a surface having only a portion thereof covered with lead compounds which portion is to be protected from the etching action comprising the steps of applying an etch containing a potassium dichromate solution which will react with said lead compound to form a protective coating of lead chromate on said lead compound which will resist etching of said lead compound.

3. The method of etching with a basic etch a surface having only a portion thereof covered with lead compounds which portion is to be protected from the etching action comprising the steps of applying an etch containing a sodium bromide solution which will react with said lead compound to form a protective coating of lead bromide on said lead compound which will resist etching of said lead compound.

4. The method of etching with a basic etch a surface having only a portion thereof covered with lead compounds which portion is to be protected from the etching action comprising the steps of applying an etch containing a potassium bromide solution which will react with said lead compound to form a protective coating of lead bromide on said lead compound which will resist etching of said lead compound.

5. The method of etching with a basic etch a surface having only a portion thereof covered with lead compounds which portion is to be protected from the etching action comprising the steps of applying an etch containing sodium sulphate solution which will react with said lead compound to form a protective coating of lead sulphate on said lead compound which will resist etching of said lead compound.

6. The method of selective etching with a basic etch a surface having only a portion thereof covered with lead compounds which portion is to be protected from the etching action comprising the steps of applying an etch containing a potassium sulphate solution which will react with said lead compound to form a protective coating of lead sulphate only on said lead compound which will resist etching of said lead compound.

7. The method of selective etching a surface having only a portion thereof covered with lead compounds which portion is to be protected from the etching action comprising the steps of applying an etch containing a solution which will react with said lead compound to form a protective coating on said lead compound which will resist etching of said lead compound.

References Cited in the file of this patent

UNITED STATES PATENTS

| | | |
|---|---|---|
| 124,905 | McGill | Mar. 26, 1872 |
| 1,492,464 | Jacobus | Apr. 29, 1924 |
| 2,808,542 | Vermilyea | Oct. 1, 1957 |
| 2,813,782 | Spanos | Nov. 19, 1957 |
| 2,879,147 | Baker | Mar. 24, 1959 |
| 2,939,772 | Newman et al. | June 7, 1960 |
| 2,955,027 | Newell et al. | Oct. 4, 1960 |